(12) United States Patent
Nitta et al.

(10) Patent No.: US 7,436,554 B2
(45) Date of Patent: Oct. 14, 2008

(54) IMAGE PROCESSING SYSTEM, IMAGE CAPTURING DEVICE, IMAGE PROCESSING TERMINAL, IMAGE PROCESSING DATA STORAGE TERMINAL, PROGRAM FOR THE DEVICE, PROGRAM FOR THE TERMINAL, DATA STRUCTURE OF IMAGE DATA, METHOD OF PROCESSING IMAGE, AND METHOD OF GENERATING IMAGE DATA

(75) Inventors: Takashi Nitta, Chino (JP); Toshio Tanaka, Shiojiri (JP); Haruhisa Kurane, Suwa (JP); Shinichi Arazaki, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 1098 days.

(21) Appl. No.: 10/617,867

(22) Filed: Jul. 14, 2003

(65) Prior Publication Data

US 2004/0095600 A1 May 20, 2004

(30) Foreign Application Priority Data

Jul. 29, 2002 (JP) ............................. 2002-220116

(51) Int. Cl.
  *H04N 1/04* (2006.01)
(52) U.S. Cl. ...................... 358/474; 358/1.15; 358/501; 382/312; 382/274; 348/333.11; 348/222.1
(58) Field of Classification Search ................. 358/474, 358/487, 501, 505, 523, 1.15; 382/312, 254, 382/274; 348/333.11, 222.1
  See application file for complete search history.

(56) References Cited

U.S. PATENT DOCUMENTS

| | | | | |
|---|---|---|---|---|
| 5,140,444 A | * | 8/1992 | Klein et al. ................. | 358/447 |
| 6,584,287 B2 | | 6/2003 | Enomoto | |
| 6,757,083 B1 | * | 6/2004 | Nakamura ................... | 358/487 |
| 6,766,263 B1 | * | 7/2004 | Stokes .......................... | 702/88 |
| 7,212,229 B2 | * | 5/2007 | Parulski et al. ............ | 348/207.2 |
| 7,271,930 B2 | * | 9/2007 | Ito et al. ..................... | 358/1.16 |
| 2001/0043372 A1 | * | 11/2001 | Suzuki et al. ............... | 358/474 |
| 2002/0030860 A1 | * | 3/2002 | Takahashi et al. ............ | 358/487 |
| 2002/0075465 A1 | * | 6/2002 | Nakamura et al. ............ | 355/40 |
| 2003/0053116 A1 | * | 3/2003 | Nakayama ................. | 358/1.15 |

FOREIGN PATENT DOCUMENTS

| | | |
|---|---|---|
| JP | A 10-191246 | 7/1998 |
| JP | A 2001-223979 | 8/2001 |
| JP | A 2002-33994 | 1/2002 |
| JP | A-2002-207242 | 7/2002 |

* cited by examiner

*Primary Examiner*—Edward Coles
*Assistant Examiner*—Negussie Worku
(74) *Attorney, Agent, or Firm*—Oliff & Berridge, PLC

(57) ABSTRACT

The invention provides an image processing system which is suitable to carry out image processing in excellent accuracy while removing influence due to characteristics depending on the type difference and which facilitates wide and flexible adaptation over image capturing devices. A digital camera includes an image pick-up sensor unit which receives images as data, a URL memory unit which stores a URL to indicate an acquisition site of image processing data, and a URL adding unit which adds the URL in the URL memory unit to the image data. The printer includes an RAW data read unit which reads out the image data, a URL acquisition unit which acquires the URL added to the image data, an image processing data acquisition unit which acquires the image processing data from the image processing data storage server based on the acquired URL, and an image data processing unit to process the image data based on the acquired image processing data.

27 Claims, 3 Drawing Sheets

IMAGE PROCESSING SYSTEM, IMAGE CAPTURING DEVICE, IMAGE PROCESSING TERMINAL, IMAGE PROCESSING DATA STORAGE TERMINAL, PROGRAM FOR THE DEVICE, PROGRAM FOR THE TERMINAL, DATA STRUCTURE OF IMAGE DATA, METHOD OF PROCESSING IMAGE, AND METHOD OF GENERATING IMAGE DATA

BACKGROUND OF THE INVENTION

1. Field of Invention

The present invention relates to a system and a method of processing image data, a device, a terminal and a program adapted to the system, a data structure of image data, and a method of generating image data. More particularly, the invention relates to an image processing system suitable to carry out image processing in excellent accuracy while removing influence of characteristics depending on the type difference and the like and facilitating wide and flexible adaptation over image capturing devices, an image capturing device, an image processing terminal, an image processing data storage terminal, a program for the device, a program for the terminal, a data structure of image data, and a method of processing image and a method of generating image data.

2. Description of Related Art

In related art digital still cameras (hereafter "digital camera"), various image processes, such as color converting, color correcting and the like, are carried out in a procedure of generating image data. However, the digital camera must carry out the image process within a restrained range of resources (performance of CPU or memory), so that there are some limitations to carry out the image processing in excellent accuracy.

In order to address or solve these limitations, the related art includes a digital camera employing the RAW format in which the digital camera does not substantially carry out the image process and output data from sensors, such as CCD (Charge Coupled Device) is output as it is. In this case, if an application dedicated to process the RAW data is installed in a personal computer (personal computer), the personal computer is able to carry out the image process in excellent accuracy. However, since the dedicated application must be installed in every type of digital cameras, it can not have generality. For example, general image processing applications, such as Photoshop of Adobe that are accustomed to users cannot be used.

In this manner, if the digital camera with the RAW format and a personal computer are combined in use, the results of image processing can be obtained in excellent accuracy while removing influence of characteristics depending on the type difference and the like. Since general users' personal computers are connected to one camera in most cases or only several cameras even if they exist, it is not complicate to install the dedicated application in every type of the cameras. However, there are problems in the case of printers other than the personal computers. That is, the related art includes direct printing type printers that connect the digital cameras or the memories thereof to read image data and to carry out image process to print out. If such direct printing type printers are intended to be generally corresponding to the digital camera of RAW format, the dedicated applications must be installed in all the types of printers to be associated, and it is difficult to achieve this.

Related art techniques of processing the image data captured by digital cameras, etc., include, for example, the image processing device disclosed in the Japanese Unexamined Patent Application Publication No. 2002-33994 (hereafter "first related art example"), the image reproducing device disclosed in the Japanese Unexamined Patent Application Publication No. 10-191246 (hereafter "second related art example"), and the image capturing device disclosed in the Japanese Unexamined Patent Application Publication No. 2001-223979 (hereafter "third related art example").

The first related art example includes a profile setting unit which sets a profile corresponding to a type of digital cameras over image data acquired by the digital camera, and an image processing unit which carries out the image process depending on the type of the digital camera using the profile set by the profile setting unit, and also includes a new profile acquisition unit which acquires a profile corresponding to a new type of a digital camera from a central server device connected through a network to supply the profile to the profile setting unit. By doing so, it is possible to remove influence due to different characteristics depending on the types of the digital cameras from the image data acquired by the digital camera and also to rapidly correspond to a new type of digital camera, so that the image process can be carried out in excellent efficiency.

In the second related art example, the capturing is carried out by a digital camera which has a function (a capturing information adding unit) to add capturing information representing a capturing condition to digital image data acquired in the capturing. An image reproducing device carries out the image process over the image data acquired in the capturing by using the capturing information added to the image data at a setup processing unit to enhance the image quality, and then reproduces the image data as a print or a display image of a monitor. By doing so, when a photographic image captured by the digital camera is reproduced, it is possible to immediately reproduce the photographic image in a high quality of image without repeating fine adjustments using a test print or a monitor checking in order to enhance the image quality.

The third related art example is an image capturing device to capture the image of a subject and recording the image data which includes an image pick-up unit to pick up the image of the subject, and a recording unit to record an image pick-up output signal output by the image pick-up unit as the image data and recording image pick-up signal format identifying information which identifies the signal format of the image pick-up output signal as separated out from the image data, and a signal processing unit to convert the image pick-up output signal recorded by the recording unit into a reproducing signal for reproduction display, and a display unit with which display the image based on the reproducing signal converted by the signal processing unit. By doing so, it is possible to record and reproduce the RAW data.

SUMMARY OF THE INVENTION

However, since the first related art example has a construction that the profile necessary for the image processing is acquired from a particular server, it is difficult to utilize profiles registered in the servers other than the particular server. When the first related art example is applied to the direct printing type printer, it has the mode that profiles with respect to the digital cameras currently provided or any digital cameras to be provided in the future are registered to the particular server and are used in the printer. However, since there are many types of digital cameras to be regarded as connected to the printer and all the digital cameras are not necessarily manufactured by the same maker, it is not practicable to register profiles in a specific server with respect to all the types to be intended to correspond to and use them in the printer. In practice, the profile with respect to the digital camera that is provided by each maker will be registered in the server that the maker operates and maintains. Therefore, in the first related art example, since it is difficult to correspond to products of plural maker's, there is a problem that it is difficult to achieve wide adaptation.

Moreover, although the second related art example has a construction that the capturing information added to the image data is received in the personal computer and the image data processing is carried out based on the added capturing information, only the capturing information representing the capturing conditions is insufficient to carry out the image process in excellent accuracy. Further, although it has been considered that the contents of the capturing information are made in detail so as to achieve the image processing in excellent accuracy, the changes of the contents of the capturing information after supplying the digital camera result in the changes of the internal specifications of the digital camera and then it is difficult to require the accuracy required for the case of implementing the image processing in a better accuracy for the existing types, so that it is difficult to make a flexible adaptation.

Moreover, although the third related art example has a construction that the RAW data added to the image pick-up signal format identifying information and the like are received in the personal computer and the image is reproduced based on the added image pick-up signal format identifying information and the like and the RAW data, it is only to reproduce the RAW data and then it is insufficient to carry out the image process in excellent accuracy. In similarity to the second related art example, although it has been considered that the contents of the image pick-up signal format identifying information and the like are made in detail so as to achieve the image processing in excellent accuracy, the changes of the contents of the image pick-up signal format identifying information and the like after supplying the digital camera result in the changes of the internal specifications of the digital camera and then it is difficult to require the accuracy required for the case of implementing the image processing in a better accuracy for the existing types, so that it is difficult to make a flexible adaptation.

These problems are not limited to the digital cameras, and the same problems are also applicable in a digital video device, an image capturing device or other devices.

Therefore, the present invention addresses the above and/or other problems, and provides an image processing system suitable to carry out image processing in excellent accuracy while removing influence of characteristics depending on the type difference and the like and facilitating wide and flexible adaptation over image capturing devices, an image capturing device, an image processing terminal, an image processing data storage terminal, a program for the device, a program for the terminal, a data structure of an image data, a method of processing an image, and a method of generating an image data.

(Aspect 1)

In order to address or accomplish the above, an image processing system of aspect 1 includes an image capturing device, an image processing data storage terminal to store image processing data necessary to carry out image processing, and an image processing terminal to carry out the image processing. The image processing system processes, with the image processing terminal, the image data captured by the image capturing device based on the image processing data in the image processing data storage terminal.

The image processing data storage terminal and the image processing terminal are communicatively connected to each other.

The image capturing device includes an image receiving device to receive images as data and an access information associating device to associate access information indicating an acquisition site of the image processing data with the image data received by the image receiving device.

The image processing terminal includes an image data input device to input the image data from the image capturing device, an image processing data acquisition device to acquire the image processing data from the image processing data storage terminal based on the access information associated with the image data input by the image data input device, and an image data processing device to process the image data input by the image data input device based on the image processing data acquired by the image processing data acquisition device.

The image processing data storage terminal provides the image processing data in response to a request from the image processing terminal.

According to this construction, when the capturing is carried out in the image capturing device, the captured image is received as a data by the image receiving device, and then the received image data is associated with access information by the access information associating device.

In the image processing terminal, the image data is input from the image capturing device by the image data input device, and the image processing data is acquired by the image processing data acquisition device from the image processing data storage terminal based on the access information corresponding to the input image data.

In the image processing data storage terminal, the image processing data is provided in response to a request from the image processing terminal.

In the image processing terminal, when the image processing data is acquired, the input image data is processed by the image data processing device based on the acquired image processing data.

Here, the access information associating device is not limited to correspond to the image data and the access information in a bundle, but it may, for example, separate the image data from the access information and add the reference information of the one of them to the other, thereby associating them. Hereafter, these are the same as an image processing system of aspect 2, an image capturing device of aspect 20 and a program for the device of aspect 23.

Furthermore, the image processing data may be any of information necessary to carry out the image processing, and for example, includes image correcting data which represents correcting values to carry out operation on the image data in order to correct the image constructed on the basis of the image data, a calculation formula data which represents a calculating formula to carry out operation on the image data in order to correct the image constructed on the basis of the image data, or an image processing module which represents program data to correct the image constructed on the basis of the image data. Hereafter, these are the same as an image processing system of aspect 2, an image capturing device of aspect 20, an image processing terminal of aspect 21, an image processing data storage terminal of aspect 22, programs for the terminals of aspects 24 and 25, a data structure of an image data of aspect 26, a method of processing an image of aspect 27, and a method of generating an image data of aspect 28.

Furthermore, the image data input device may have any of constructions that the image data can be input from the image capturing device, and for example, may have the construction that the image data is input from the image capturing device when the image capturing device and the image processing terminal are communicatively connected to each other or the construction that in case of the image capturing device having an image data memory device to store the image data, the image data memory device is separated out from the image capturing device and then the image data is input from the image data memory device. Hereafter, these are the same as an image processing system of aspect 2, an image processing terminal of aspect 21, and a program for the terminal of aspect 24.

(Aspect 2)

Further, an image processing system of aspect 2 includes an image capturing device, an image processing data storage terminal to store image processing data necessary to carry out image processing, and an image processing terminal to carry out the image processing. The image processing system processes, with the image processing terminal, the image data captured by the image capturing device based on the image processing data in the image processing data storage terminal.

The image processing data storage terminal and the image processing terminal are communicatively connected to each other.

The image capturing device includes an image receiving device to receive images as data, an access information memory device to store access information indicating an acquisition site of the image processing data, and an access information associating device to associate the access information in the access information memory device with the image data received by the image receiving device.

The image processing terminal includes an image data input device to input the image data from the image capturing device, an access information acquisition device to acquire the access information associated with the image data input by the image data input device, an image processing data acquisition device to acquire the image processing data from the image processing data storage terminal based on the access information acquired by the access information acquisition device, and an image data processing device to process the image data input by the image data input device based on the image processing data acquired by the image processing data acquisition device.

The image processing data storage terminal includes an image processing data memory device to store the image processing data, and an image processing data supplying device to supply an image processing data corresponding to a request from the image processing terminal among the image processing data in the image processing data memory device to the image processing terminal.

According to this construction, when the capturing is carried out in the image capturing device, the captured image is received as a data by the image receiving device, and then the received image data is associated with the access information in the access information memory device by the access information associating device.

In the image processing terminal, the image data is input from the image capturing device by the image data input device, the access information associated with the input image data is acquired by the access information acquisition device, and the image processing data is acquired by the image processing data acquisition device from the image processing data storage terminal based on the acquired access information.

In the image processing data storage terminal, when receiving a request from the image processing terminal, the image processing data responding to the request from the image processing terminal, among the image processing data of the image processing data memory device is provided to the image processing terminal by the image processing data supplying device.

In the image processing terminal, when the image processing data is acquired, the input image data is processed by the image data processing device based on the acquired image processing data.

Here, the access information memory device stores the access information by any method at any time, and in other words, it may store the access information at the previous time, or it may not store the access information at the previous time but store the access information via input from external sides at the time of operation of this system. Hereafter, these are the same as an image capturing device of aspect 20, a program for the device of aspect 23, a method of processing an image of aspect 27, and a method of generating an image data of aspect 28.

Here, the image processing data memory device stores the image processing data by any method at any time, and in other words, it may store the image processing data at the previous time, or it may not store the image processing data at the previous time but store the image processing data via input from external sides at the time of operation of this system. Hereafter, these are the same as an image processing data storage terminal of aspect 22, a program for the terminal of aspect 25, and a method of processing an image of aspect 27.

(Aspect 3)

Further, an image processing system of aspect 3 according to the image processing system of aspect 2 further includes a plurality of the image processing data storage terminals.

The image processing data acquisition device accesses the image processing data storage terminal specified by the access information acquired by the access information acquisition device, among the plurality of the image processing data storage terminals, and acquires the image processing data from the image processing data storage terminal.

According to this construction, in the image processing terminal, by the image processing data acquisition device, the image processing data storage terminal specified by the acquired access information, among the plurality of the image processing data storage terminals is accessed and the image processing data is acquired from the image processing data storage terminal.

(Aspect 4)

Further, an image processing system of aspect 4 according to the image processing system of aspect 3 is provided such that the image processing data is image correcting data representing correcting values to carry out a calculation on the image data in order to correct an image constructed on the basis of the image data.

According to this construction, in the image processing terminal, when the image correcting data is acquired, an operation is carried out over the input image data by the image data processing device based on the acquired image correcting data and then the image correcting is carried out.

(Aspect 5)

Further, an image processing system of aspect 5 according to the image processing system of aspect 3 is provided such that the image processing data is an image processing module representing program data which corrects an image constructed on the basis of the image data.

According to this construction, in the image processing terminal, when the image processing module is acquired, the acquired image processing module is carried out over the image data by the image data processing device and then the image is corrected by the carrying-out.

(Aspect 6)

Further, an image processing system of aspect 6 according to the image processing system of any one of aspects 3 to 5 is provided such that the access information associating device adds the access information in the access information memory device to the image data received by the image receiving device.

According to this construction, in the image capturing device, the access information in the access information memory device is added to the received image data by the access information associating device. By doing so, the image data and the access information are associated with each other.

(Aspect 7)

Further, an image processing system of aspect 7 according to the image processing system of any one of aspects 3 to 5 is provided such that the access information associating device generates files in a separate manner from the image data received by the image receiving device and the access information in the access information memory device, and adds reference information to one of the image data files storing the image data and the access information file storing the access information, the reference information having the other thereof as a reference site.

According to this construction, in the access information associating device, the received image data and the access information in the access information memory device are generated as separate files, respectively, and the information having one of the image data files and the access information file as a reference site is added to the other thereof. By doing so, the image data and the access information are associated with each other.

(Aspect 8)

Further, an image processing system of aspect 8 according to the image processing system of any one of aspects 3 to 5 is provided such that the access information associating device encrypts the access information in the access information memory device, and superposes the encrypted access information on the image data received by the image receiving device.

According to this construction, in the access information associating device, the access information in the access information memory device is encrypted, and the encrypted access information is superposed on the received image data. By doing so, the image data and the access information are associated with each other.

(Aspect 9)

Further, an image processing system of aspect 9 according to the image processing system of any one of aspects 3 to 8 is provided such that the image capturing device further includes a capturing information generating device to generate capturing information representing capturing modes or a capturing environment of the image over the image data received by the image receiving device, and a capturing information associating device to associate the capturing information generated by the capturing information generating device to the image data received by the image receiving device.

According to this construction, in the image capturing device, the capturing information representing the capturing mode or the capturing environment of the image over the received image data is generated by the capturing information generating device, and the capturing information is associated with the received image data by the capturing information associating device.

(Aspect 10)

Further, an image processing system of aspect 10 according to the image processing system of any one of aspects 3 to 9 is provided such that the access information memory device stores the access information for each of the capturing modes when a plurality of the capturing modes is defined, and the access information associating device reads out the access information corresponding to a plurality of capturing modes, which are all different, from the access information memory device, and associates the plurality of pieces of read access information with the image data.

According to this construction, by the access information associating device, the access information associated with the plurality of different capturing modes are read respectively from the access information memory device, and the plurality of the read information are associated with the image data.

Here, the access information associating device reads out the access information associated with the plurality of different capturing modes, but it may read the access information corresponding to all the capturing modes or the access information corresponding to some of the capturing modes. In the latter case, for example, the access information corresponding to the capturing mode same as or associated with the capturing modes over the received image data can be read.

(Aspect 11)

Further, an image processing system of aspect 11 according to the image processing system of aspect 10 is provided such that the image processing terminal further includes a capturing mode designating device to designate the capturing modes, and the access information acquisition device acquires the access information corresponding to the capturing mode designated by the capturing mode designating device, among the plurality of pieces of access information associated with the image data input by the image data input device.

According to this construction, in the image processing terminal, when the capturing mode is designated by the capturing mode designating device, the access information corresponding to the designated capturing mode, is acquired from among the plurality of pieces of access information corresponding to the input image data by the access information acquisition device.

(Aspect 12)

Further, an image processing system of aspect 12 according to the image processing system of any one of aspects 3 to 9 is provided such that the access information memory device stores the access information for each of the output devices when a plurality of output devices to output the image formed on the basis of the image data is defined; and the access information associating device reads out the access information associated with the plurality of different output devices respectively from the access information memory device, and associates the plurality of the read access information with the image data.

According to this construction, by the access information associating device, the access information corresponding to the different plurality of the output devices are read respectively from the access information memory device, and the plurality of the read information is associated with the image data.

Here, the access information associating device reads out the access information corresponding to the different plurality of the output devices, but it may read the access information corresponding to all the output devices or the access information corresponding to some of the output devices. In the latter case, for example, the access information associated with the output devices same as or associated with the output devices over the received image data can be read.

Further, the output devices include, for example, a printer, a display, or other devices to output the image data.

(Aspect 13)

Further, an image processing system of aspect 13 according to the image processing system of aspect 12 is provided such that the image processing terminal further includes an output device designating device to designate the output devices, and the access information acquisition device acquires the access information associated with the output device designated by the output device designating device, among the plurality of pieces of access information associated with the image data input by the image data input device.

According to this construction, in the image processing terminal, when the output device is designated by the output device designating device, the access information corresponding to the designated output device, is acquired from among the plurality of pieces of access information corresponding to the input image data by the access information acquisition device.

(Aspect 14)

Further, an image processing system of aspect 14 according to the image processing system of any one of aspects 3 to 13 is provided such that the access information is a URL.

According to this construction, in the image capturing device, the URL in the access information memory device is associated with the received image data by the access information associating device.

In the image processing terminal, the image data is input from the image capturing device by the image data input device, the URL corresponding to the input image data is acquired by the access information acquisition device, the image processing data is acquired from the image processing data storage terminal by the image processing data acquisition device based on the acquired URL.

(Aspect 15)

Further, an image processing system of aspect 15 according to the image processing system of any one of aspects 3 to 14 is provided such that the image receiving device receives the image as RAW data.

According to this construction, in the image capturing device, the image is received as RAW data by the image receiving device.

(Aspect 16)

Further, an image processing system of aspect 16 according to the image processing system of aspect 15 is provided such that the image capturing device further includes an image data compressing device to compress the RAW data received by the image receiving device using a predetermined compressing scheme, and the access information associating device associates the access information in the access information memory device with the compressed image data compressed by the image data compressing device.

According to this construction, in the image capturing device, the received RAW data is compressed using a predetermined compressing scheme by the image data compressing device, and the access information in the access information memory device is associated with the compressed image data by the access information associating device.

Here, the predetermined compressing scheme may be employed among any compressing schemes including irreversible compressing schemes, such as JPEG (Joint Photographic coding Experts Group), or reversible compressing schemes, such as LZH and ZIP, but it is preferable that the reversible compressing scheme is employed in terms of obtaining the result of image processing in excellent accuracy.

(Aspect 17)

Further, an image processing system of aspect 17 according to the image processing system of any one of aspects 3 to 16 is provided such that the image processing data memory device stores the compressed image processing data into which the image processing data is compressed using a predetermined compressing scheme, the image processing terminal further includes an image processing data restoring device to restore the compressed image processing data acquired by the image processing data acquisition device using a restoring scheme corresponding to the compressing scheme, and the image data processing device processes the image data input by the image data input device based on the image data restored by the image processing data restoring device.

According to this construction, in the image processing data storage terminal, when receiving a request from the image processing terminal, the compressed image processing data responding to the request from the image processing terminal, among the compressed image processing data in the image processing data memory device is provided to the image processing terminal by the image processing data supplying device.

In the image processing terminal, when the compressed image processing data is acquired, the acquired compressed image processing data is restored by the image processing data restoring device in a predetermined recovering scheme, and the input image data is processed by the image data processing device based on the restored image processing data.

(Aspect 18)

Further, an image processing system of aspect 18 according to the image processing system of any one of aspects 3 to 17 is provided such that the image data processing device generates CMYK data from the image data input by the image data input device.

According to this construction, in the image processing terminal, the CMYK data is generated from the input image data by the image data processing device.

(Aspect 19)

Further, an image processing system of aspect 19 according to the image processing system of any one of aspects 3 to 18 is provided such that the image processing terminal is a printer to carry out printing based on the image data processed by the image data processing device.

According to this construction, in the printer, the image data is input from the image capturing device by the image data input device, the access information associated with the input image data is acquired by the access information acquisition device, and the image processing data is acquired from the image processing data storage terminal by the image processing data acquisition device based on the acquired access information.

In the image processing data storage terminal, when receiving a request from the printer, the image processing data responding to the request from the printer, among the image processing data in the image processing data memory device is provided to the printer by the image processing data supplying device.

In the printer, when the image processing data is acquired, the input image data is processed by the image data processing device based on the acquired image processing data, and the printing is carried out based on the processed image data.

(Aspect 20)

Further, in order to address or accomplish the above, an image capturing device of aspect 20 adapted to the image processing system of aspect 2 includes an image receiving device to receive images as data, an access information memory device to store access information indicating an acquisition site of the image processing data, and an access information associating device to associate the access information in the access information memory device with the image data received by the image receiving device.

According to this construction, it is possible to obtain functions equivalent to those of image capturing device in the image processing system of aspect 2.

(Aspect 21)

Further, in order to address or accomplish the above, an image processing terminal of aspect 21 adapted to the image processing system of aspect 2 includes an image data input device to input the image data from the image capturing device, an access information acquisition device to acquire the access information associated with the image data input by the image data input device, an image processing data acquisition device to acquire the image processing data from the image processing data storage terminal based on the access information acquired by the access information acquisition device, and an image data processing device to process the image data input by the image data input device based on the image processing data acquired by the image processing data acquisition device.

According to this construction, it is possible to obtain functions equivalent to those of an image processing terminal in the image processing system of aspect 2.

(Aspect 22)

Further, in order to address or accomplish the above, an image processing data storage terminal of aspect 22 adapted to the image processing system of aspect 2 includes an image processing data memory device to store the image processing data, and an image processing data supplying device to supply an image processing data corresponding to a request from the image processing terminal from among the image processing data in the image processing data memory device to the image processing terminal.

According to this construction, it is possible to obtain functions equivalent to those of image processing data storage terminal in the image processing system of aspect 2.

(Aspect 23)

Further, in order to address or accomplish the above, a program for a device of aspect 23 for execution on the image capturing device disclosed in aspect 20, which is made of a computer includes a program for executing a process implemented by the access information associating device to associate the access information in the access information memory device with the image data received by the image receiving device.

According to this construction, when the program is read by the computer and the process is carried out by the computer in accordance with the read program, it is possible to obtain functions equivalent to those of the image capturing device of aspect 20.

(Aspect 24)

Further, in order to address or accomplish the above, a program for a terminal of aspect 24 for execution on the image processing terminal of aspect 21, which is made of a computer includes a program for executing processes implemented by the image data input device to input the image data from the image capturing device, the access information acquisition device to acquire the access information associated with the image data input by the image data input device, the image processing data acquisition device to acquire the image processing data from the image processing data storage terminal based on the access information acquired by the access information acquisition device, and the image data processing device to process the image data input by the image data input device based on the image processing data acquired by the image processing data acquisition device.

According to this construction, when the program is read by the computer and processing is carried out by the computer in accordance with the read program, it is possible to obtain functions equivalent to those of the image processing terminal of aspect 21.

(Aspect 25)

Further, in order to address or accomplish the above, a program for a terminal of aspect 25 for execution on the image processing data storage terminal of aspect 22, which is made of a computer includes a program for executing a process implemented by the image processing data supplying device to supply an image processing data corresponding to a request from the image processing terminal from among the image processing data in the image processing data memory device to the image processing terminal.

According to this construction, when the program is read by the computer and processing is carried out by the computer in accordance with the read program, it is possible to obtain functions equivalent to those of the image processing data storage terminal of aspect 22.

(Aspect 26)

Further, in order to address or accomplish the above, a data structure of an image data of aspect 26, which is a data structure of an image data in the image processing system of aspect 6 includes the image data and access information indicating an acquisition site of the image processing data and the access information is added to the image data.

According to this construction, in the image processing terminal, the image data is input from the image capturing device by the image data input device, the access information added to the input image data is acquired from the image data by the access information acquisition device, and the image processing data is acquired from the image processing data storage terminal by the image processing data acquisition device based on the acquired access information.

(Aspect 27)

Further, in order to address or accomplish the above, an image processing method of aspect 27, which is a method of communicatively connecting to each other an image processing data storage terminal to store image processing data necessary to carry out image processing and an image processing terminal to carry out the image processing based on the image processing data, and of processing the image data captured by the image capturing device using the image processing data storage terminal, the image processing terminal and the image capturing device. The method includes: in the image capturing device, an image receiving step of receiving the images as data, and an access information associating step of associating access information in access information memory device to store access information indicating an acquisition site of the image processing data with the image data received in the image receiving step; in the image processing terminal, an image data input step of inputting the image data from the image capturing device, an access information acquisition step of acquiring the access information associated with the image data input in the image data input step, and an image processing data acquisition step of acquiring the image processing data from the image processing data storage terminal based on the access information acquired in the access information acquisition step; in the image processing data storage terminal, an image processing data supplying step of supplying the image processing data responding to a request from the image processing terminal, among the image processing data in an image processing data memory device to store the image processing data to the image processing terminal; and in the image processing terminal, an image data processing step of processing the image data input in the image data input step based on the image processing data acquired in the image processing data acquisition step.

Here, the image data input step may include any method that the image data can be input from the image capturing device, and for example, may include a method that the image data is input from the image capturing device when the image capturing device and the image processing terminal are communicatively connected to each other, or a method that in case of the image capturing device having an image data memory device to store the image data, the image data memory device being separated out from the image capturing device and then the image data is input from the image data memory device.

(Aspect 28)

Further, in order to address or accomplish the above, an image data generating method of aspect 28, which is a method of generating an image data includes an image receiving step of receiving the images as data, and an access information associating step of associating access information in access information memory device to store access information indicating an acquisition site of the image processing data with the image data received in the image receiving step.

DETAILED DESCRIPTION OF PREFERRED EMBODIMENTS

Figure 1:
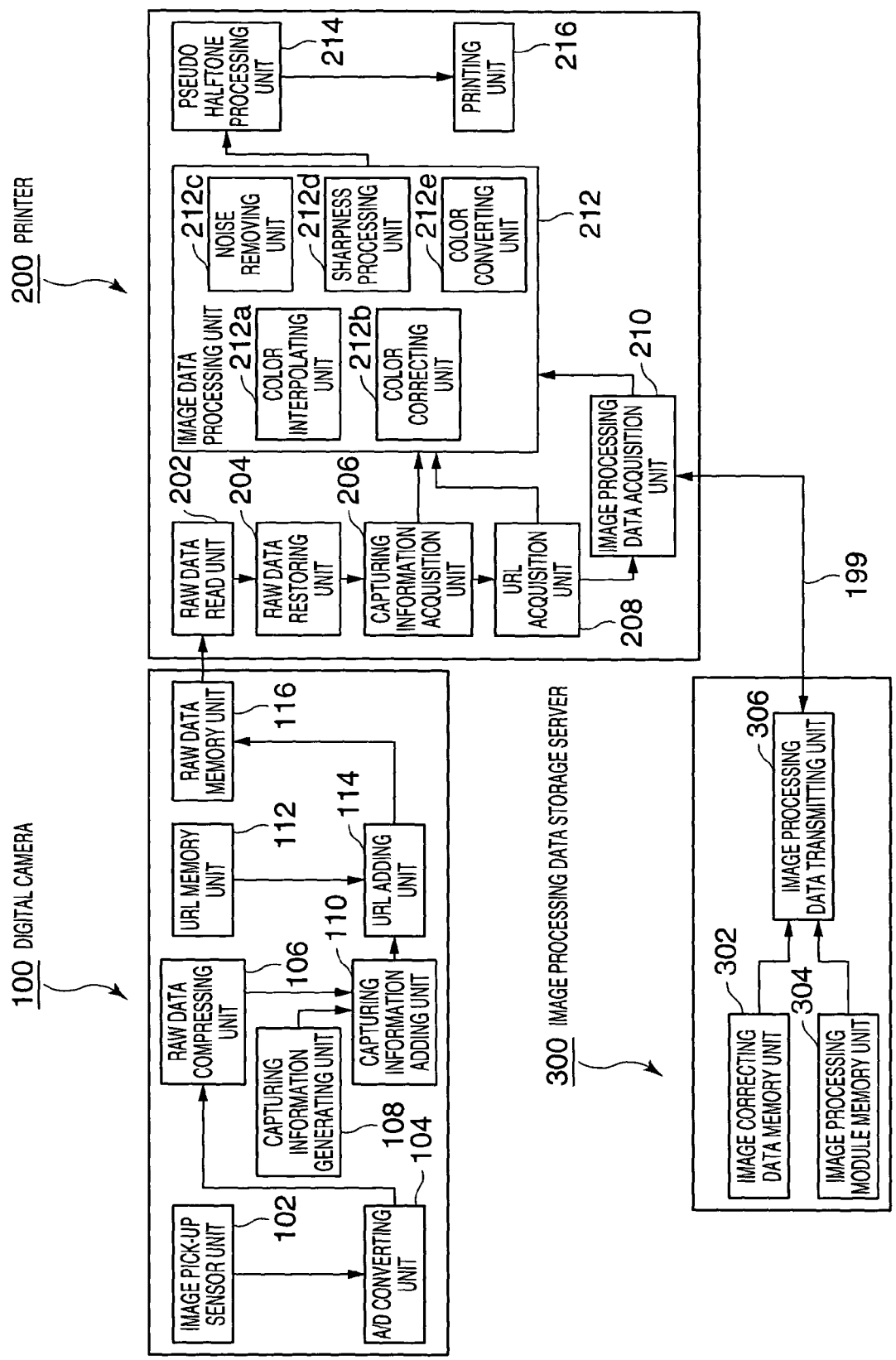
FIG. 1 is a schematic illustrating an image processing system according to the present invention.
Figure 2:
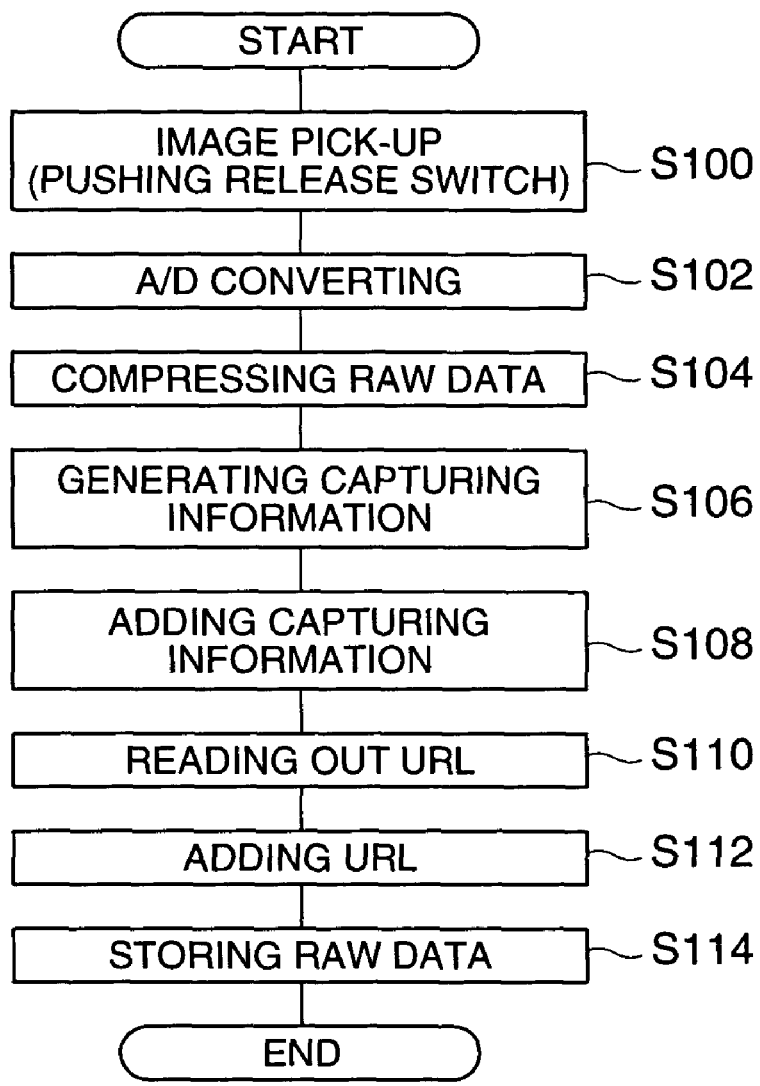
FIG. 2 is a flowchart illustrating an image capturing processing.
Figure 3:
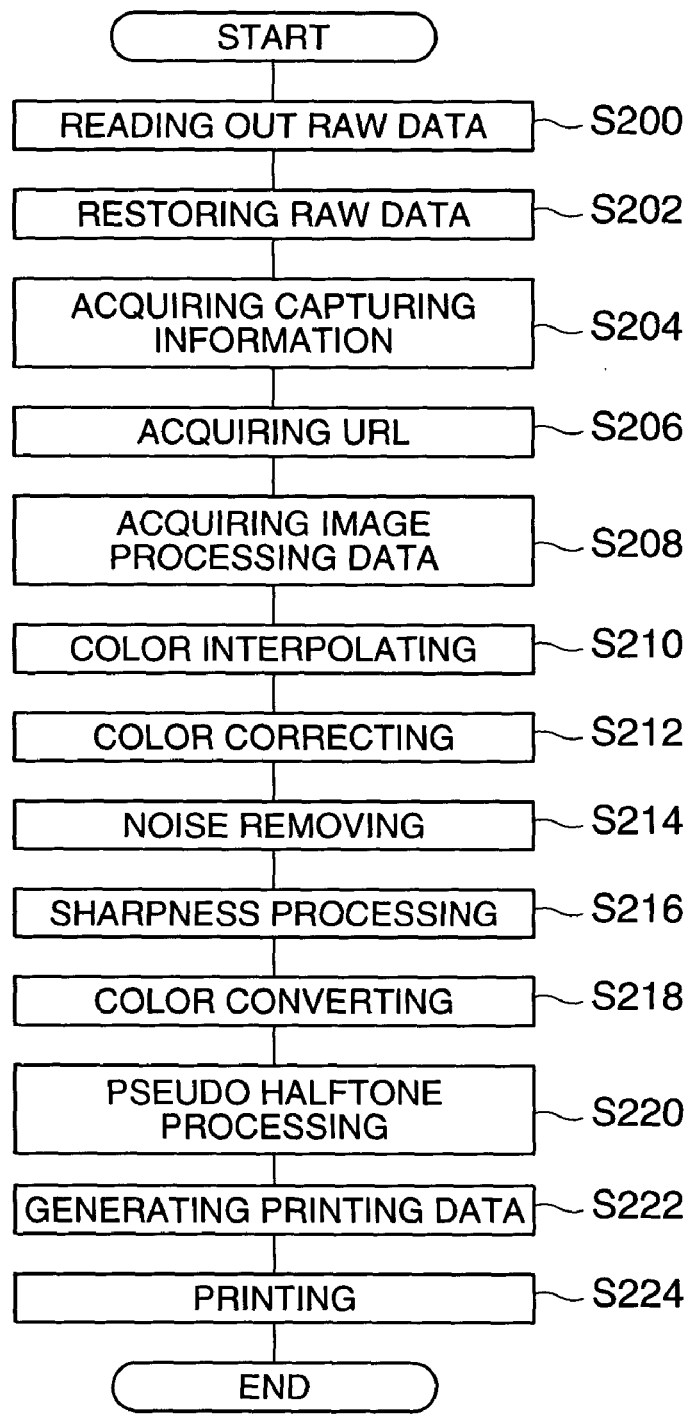
FIG. 3 is a flowchart illustrating an image printing process.

Exemplary embodiments according to the present invention are described below with reference to the drawings. FIGS. 1 to 3 are schematics illustrating exemplary embodiments of an image processing system, an image capturing device, an image processing terminal, an image processing data storage terminal, a program for the device, a program for the terminal, a data structure of an image data, a method of processing an image, and a method of generating an image data according to the present invention.

As shown in FIG. 1, the present exemplary embodiment includes an image processing system, an image capturing device, an image processing terminal, an image processing data storage terminal, a program for the device, a program for the terminal, a data structure of an image data, a method of processing an image, and a method of generating an image data according to the present invention are applied to the case that a printer 200 processes an image data captured by a digital camera 100 to be printed.

First, the image processing system according to the present invention is described below with reference to FIG. 1. FIG. 1 is a schematic illustrating the image processing system according to the present invention.

The image processing system according to the present invention, as shown in FIG. 1, includes the digital camera 100, a direct printing type printer 200 which processes the image data captured by the digital camera 100 to be printed, and an image processing data storage server 300 which stores image processing data necessary to carry out image processing.

The digital camera 100 and the printer 200 are communicatively connected to each other through a predetermined cable when the printer 200 carries out printing image, and then the image data captured by the digital camera 100 is transmitted to the printer 200. Furthermore, the connection is not limited to the cable connection, but it may be possible that the built-in memory is separated out from the digital camera 100 and then the printer 200 reads the built-in memory, thereby the image data being transmitted to the printer 200.

Further, the printer 200 and the image processing data storage server 300 are communicatively connected to each other through the Internet 199. Moreover, although the only one image processing data storage server 300 is shown for the sake of easily understanding the present invention, in practice, a plurality of the image processing data storage servers 300 are connected through the Internet 199.

Next, the construction of the digital camera 100 is described in detail with reference to FIG. 1.

The digital camera 100, as shown in FIG. 1, includes an image pick-up sensor unit 102, an A/D converting unit 104 which A/D-converts the image pick-up signal from the image pick-up sensor unit 102, an RAW data compressing unit 106 which compresses an RAW data from the A/D converting unit 104, a capturing information generating unit 108 which generates capturing information, a capturing information adding unit 110 which adds the capturing information to the compressed RAW data from the RAW data compressing unit 106, a URL memory unit 112 which stores a URL, a URL adding unit 114 which adds the URL to the compressed RAW data from the capturing information adding unit 110, and an RAW data memory unit 116 which stores the compressed RAW data from the URL adding unit 114.

The image pick-up sensor unit 102 includes a predetermined number of pixels which are constructed with CCD, CMOS (Complementary Metal-Oxide Semiconductor), and the like, and receives an image using a mechanical shutter or an electronic shutter as light quantity at the time that a release switch (not shown) is pushed on. The receiving is carried out every pixel, and for example in case of 5 million pixels, the detection of the light quantity is carried out every pixel in a quadrilateral arrangement having 2,500 pixels in the horizontal direction and 2,000 pixels in the vertical direction. Further, an analog signal representing the detection quantity of each pixel is output as an image pick-up signal to A/D converting unit 104.

The image pick-up signal is input from the image pick-up sensor unit 102, the A/D converting unit 104 A/D-converts the signal to a digital data which has, for example, 8 to 16 bit representing the luminance per pixel, and outputs the RAW data obtained with the A/D-converting to the RAW data compressing unit 106.

The RAW data compressing unit 106 compresses the RAW data received by the A/D converting unit 104 in a reversible compressing scheme in order to reduce the data capacity of the RAW data and then outputs the compressed RAW data to the capturing information adding unit 110. For example, the compressing format such as LZH and ZIP, can be utilized for the reversible compressing scheme.

The capturing information generating unit 108 generates the capturing information representing the capturing mode or the capturing environment of the image over the received RAW data received from the A/D converting unit 104 and outputs the generated capturing information to the capturing information adding unit 110. The capturing information, which is noticeable from the digital camera 100 at the time of the capturing includes information about, for example, exposure (diaphragm, speed of shutter, etc.), light source (daylight, fluorescent lamp, incandescent lamp, etc.), flash information, exposure mode (automatic, manual, etc.), capturing mode (landscape, portrait, nightscape, etc.), distance from subject, region of subject (a position which can be focused, a position of the image on which the subject is located), and white balance setting (automatic, fixed, etc.).

The capturing information adding unit 110 adds the capturing information generated at the capturing information generating unit 108 to the front end of the compressed RAW data from the RAW data compressing unit 106 and then outputs the compressed RAW data added with the capturing information to the URL adding unit 114.

In the URL memory unit 112, a plurality of URLs which represent the acquisition sites of the image processing data according to the characteristics of the digital camera 100 are stored. The image processing data include, for example, image correcting data which represents correcting values to carry out a calculation on the RAW data in order to correct the image constructed on the basis of the RAW data, and an image processing module which represents program data correcting the image constructed on the basis of the RAW data.

The URL adding unit 114 adds the URL in the URL memory unit 112 to the front end of the compressed RAW data from the capturing information adding unit 110 and stores the compressed RAW data added with the URL to the RAW data memory unit 116.

The digital camera 100 is, more specifically, constructed having the same functions as those of a general computer in which CPU, ROM, RAM, and I/F are connected through bus, and the CPU which is constructed with micro processing unit (MPU) starts up a predetermined program stored in a predetermined region of ROM to carry out the image capturing processing as shown in the flowchart of FIG. 2 in accordance with the program.

FIG. 2 is a flowchart illustrating an image capturing processing.

The image capturing processing which is a processing to capture an image and storing the RAW data obtained by capturing the image in the built-in memory, first proceeds to step S100 at the execution in CPU, as shown in FIG. 2.

In Step S100, the capturing is carried out by the image pick-up sensor unit 102 at the timing that a release switch (not shown) is pushed on to proceed to step S102, the image pick-up signal from the image pick-up sensor unit 102 is A/D-converted to proceed to step S104, and the RAW data obtained with A/D-converting is compressed in a reversible compressing scheme to proceed to step S106.

In step S106, the capturing information is generated to proceed to step S108, the generated capturing information is added to the frond end of the compressed RAW data to proceed to step S110, and the URL is read from the URL memory unit 112 to proceed to step S112.

In step S112, the read URL is added to the front end of the compressed RAW data added with the capturing information to proceed to step S114, the compressed RAW data added with the capturing information and the URL is stored in the RAW data memory unit 116, and a series of process are completed to return the original process.

Next, the construction of the printer 200 is described in detail with reference to FIG. 1.

The printer 200, as shown in FIG. 1, includes an RAW data read unit 202 which reads out the compressed RAW data, an RAW data restoring unit 204 which restores the compressed RAW data read in the RAW data read unit 202, a capturing information acquisition unit 206 which acquires the capturing information from the RAW data of the RAW data restoring unit 204, a URL acquisition unit 208 which acquires the URL from the RAW data of the capturing information acquisition unit 206, an image processing data acquisition unit 210 which acquires the image processing data from the image processing data storage server 300, an image data processing unit 212 which carries out the image processing over the RAW data from the URL acquisition unit 208, a pseudo halftone processing unit 214 which carries out a pseudo halftone processing over the RAW data on which the processing is completed from the image data processing unit 212, and a printing unit 216 which carries out printing based on the RAW data on which the processing is completed from the pseudo halftone processing unit 214.

The RAW data read unit 202 reads out the compressed RAW data from the RAW data memory unit 116 when it communicatively connects the digital camera 100, and then it outputs the read compressed RAW data to the RAW data restoring unit 204.

The RAW data restoring unit 204 restores the compressed RAW data from the RAW data read unit 202 in a reversible restoring scheme corresponding to the aforementioned reversible compressing scheme, and then outputs the restored RAW data to the capturing information acquisition unit 206.

The capturing information acquisition unit 206 acquires the capturing information from the RAW data of the RAW data restoring unit 204 and then outputs the acquired capturing information to the image data processing unit 212 and simultaneously outputs the RAW data to the URL acquisition unit 208.

The URL acquisition unit 208 acquires the URL from the RAW data of the capturing information acquisition unit 206 and then outputs the acquired URL to the image processing data acquisition unit 210 and simultaneously outputs the RAW data to the image data processing unit 212.

The image processing data acquisition unit 210 accesses the image processing data storage server 300 specified by the URL from the URL acquisition unit 208, acquires the image correcting data and the image processing module from the image processing data storage server 300 as the image processing data, and outputs the acquired image processing data to the image data processing unit 212.

The image data processing unit 212 comprises a color interpolating unit 212a, a color correcting unit 212b, a noise removing unit 212c, a sharpness processing unit 212d, and a color converting unit 212e.

The color interpolating unit 212a carries out a color interpolating over the RAW data of the URL acquisition unit 208 based on the capturing information from the capturing information acquisition unit 206 and the image correcting data and the image processing module from the image processing data acquisition unit 210, and then outputs the RGB data carried out with the color interpolating to the color correcting unit 212b. Since CCD is only able to detect the light quantity, in order to acquire color image, the digital camera 100 is further provided with a color filter (RGB or YMCG) in front of the sensor and detects the light passing through the color filter, thereby detecting the light quantity of each color of the RGB. For this reason, it is necessary to obtain as a URL how many color filters the data of each pixel is acquired by passing through. Further, it may be acquired as an image processing module. In the result of the color interpolating, full color data (48[bit/pixel]) having all the data of each pixel RGB is generated by one data (16[bit/pixel]) of any one color of each pixel RGB. However, the RGB data of this case is a RGB data in the color space defined by the maker of the digital camera 100.

The color correcting unit 212b carries out a color correcting of, for example brightness, contrast, chromaticity, color blurring, memory color such as flesh-color or green of tree, and the like over the RGB data from the color interpolating unit 212a based on the capturing information from the capturing information acquisition unit 206 and the image correcting data and the image processing module from the image processing data acquisition unit 210, and then outputs the RGB data carried out with the color correcting to the noise removing unit 212c.

The noise removing unit 212c carries out a noise removing over the RGB data from the color correcting unit 212b based on the capturing information from the capturing information acquisition unit 206 and the image processing data from the image processing data acquisition unit 210, and then outputs the RGB data carried out with the noise removing to the sharpness processing unit 212d.

The a sharpness processing unit 212d carries out a sharpness processing over the RGB data from the noise removing unit 212c based on the capturing information from the capturing information acquisition unit 206 and the image processing data from the image processing data acquisition unit 210, and then outputs the RGB data carried out with the sharpness processing to the color converting unit 212e.

The color converting unit 212e carries out RGB-CMYK converting over the RGB data from the sharpness processing unit 212d based on the capturing information from the capturing information acquisition unit 206 and the image processing data from the image processing data acquisition unit 210, and then outputs the RGB data carried out with the color converting to the pseudo halftone processing unit 214.

The pseudo halftone processing unit 214 carries out a pseudo halftone processing over the RAW data from the color converting unit 212e by using such a processing as error diffusion, converts it into CMYK data having multi-value such as two-value, four-value, etc., and outputs the converted CMYK data to the printing unit 216.

The printing unit 216 carries out printing based on the CMYK data from pseudo halftone processing unit 214.

The printer 200 is, more specifically, constructed having the same functions as those of a general computer in which CPU, ROM, RAM, and I/F, etc., are connected through a bus, and the CPU which is constructed with micro processing unit (MPU) or the like starts up a predetermined program stored in a predetermined region of ROM to carry out the image printing processing as shown in the flowchart of FIG. 3 in accordance with the program. FIG. 3 is a flowchart illustrating an image printing processing.

The image printing processing which, when communicatively connected with the digital camera 100 is communicatively connected, is a processing to read out the RAW data from the digital camera 100 and then carry out printing over the read RAW data, first proceeds to step S200 at the execution in CPU, as shown in FIG. 3.

In Step S200, the compressed RAW data is read from the RAW data memory unit 116 to proceed to step S202, the read compressed RAW data is restored to proceed to step S204, and the capturing information is acquired from the restored RAW data to proceed to step S206.

In step S206, the URL is acquired from the restored RAW data to proceed to step S208, the image processing data storage server 300 specified by the acquired URL is accessed, the image processing data is acquired from the image processing data storage server 300 to proceed to step S210, and the color interpolating is carried out over the RAW data based on the image processing data and the capturing information to proceed to step S212.

In step S212, the color correcting is carried out over the RGB data based on the image processing data and the capturing information to proceed to step S214, the noise removing is carried out over the RGB data based on the image processing data and the capturing information to proceed to step S216, and the sharpness processing is carried out over the RGB data based on the image processing data and the capturing information to proceed to step S218.

In step S218, the color converting is carried out over the RGB data based on the image processing data and the capturing information to proceed to step S220, the pseudo halftone processing is carried out over the RGB data to proceed to step S222, and the printing data is generated based on the CMYK data carried out with the pseudo halftone processing to proceed to step S224.

In S224, the printing is carried out based on the generated printing data, and a series of process are completed to return the original process.

Next, the construction of the image processing data storage server 300 is described in detail with reference to FIG. 1.

The image processing data storage server 300, as shown in FIG. 1, includes an image correcting data memory unit 302 which stores image correcting data, an image processing module memory unit 304 which stores an image processing module, and an image processing data transmitting unit 306 which, in response to a request from the printer 200, transmits the image correcting data from the image correcting data memory unit 302 or the image processing module from the image processing module memory unit 304 as image processing data to the printer 200.

Next, the operations of the present exemplary embodiments are described.

In the digital camera 100, when a release switch (not shown) is pushed on by a user, capturing is carried out through steps S100 to S104 by the image pick-up sensor unit 102 at the timing that a release switch is pushed on, the image pick-up signal from the image pick-up sensor unit 102 is A/D-converted by the A/D converting unit 104, and the RAW data obtained with A/D-converting is compressed by the RAW data compressing unit 106 in a reversible compressing scheme.

Subsequently, through steps S106 and S108, the capturing information is generated by the capturing information generating unit 108, and the generated capturing information is added to the frond end of the compressed RAW data by the capturing information adding unit 110. Further, through steps S110 to S114, the URL is read from the URL memory unit 112 by the URL adding unit 114, the read URL is added to the front end of the compressed RAW data, and the compressed RAW data added with the capturing information and the URL is stored in the RAW data memory unit 116.

Next, when the digital camera 100 and the printer 200 are communicatively connected in order to carry out the image printing at the printer 200, in the printer 200, through steps S200 to S204, the compressed RAW data from the RAW data memory unit 116 is read by the RAW data read unit 202, the read compressed RAW data is restored by the RAW data restoring unit 204, and the capturing information is acquired from the restored RAW data by the capturing information acquisition unit 206.

Subsequently, through steps S206 and S208, the URL is acquired from the restored RAW data by the URL acquisition unit 208, the image processing data storage server 300 specified by the acquired URL is accessed by the image processing data acquisition unit 210, and the image processing data is acquired from the image processing data storage server 300.

In the image processing data storage server 300, when a request from the printer 200 is received, the image processing data transmitting unit 306 transmits the image correcting data or the image processing module corresponding to the request from the printer 200, from among the image correcting data of the image correcting data in the image correcting data memory unit 302 and the image processing module in the image processing module memory unit 304, to the printer 200.

In the printer 200, if the image processing data is acquired, when it is the image processing module, the image processing module is carried out, and when it is the image correcting data, the image processing such as the color interpolating is carried out based on the image correcting data. More specifically, through steps S210 to S218, an image processing, such as color interpolating, color correcting, noise removing, sharpness processing and color converting is carried out by the image data processing unit 212 based on the acquired image processing data and the capturing information over the RAW data. Further, through steps S220 to S224, the pseudo halftone processing is carried out by the pseudo halftone processing unit 214 over the RGB data from the image data processing unit 212, the result is converted into CMYK data having multi-value, such as two-value, four-value, etc., and then the printing is carried out by the printing unit 216 based on the generated CMYK data.

In this manner, in the present exemplary embodiment, the digital camera 100 includes the image pick-up sensor unit 102 and the A/D converting unit 104 which receive the images as data, the URL memory unit 112 which stores the URL indicating the acquisition site of the image processing data, and the URL adding unit 114 which adds the URL of the URL memory unit 112 to the RAW data; the printer 200 includes the RAW data read unit 202 which reads out the RAW data from the digital camera 100, the URL acquisition unit 208 which acquires the URL added to the RAW data read at the RAW data read unit 202, the image processing data acquisition unit 210 which acquires the image processing data from the image processing data storage server 300 based on the URL acquired from the URL acquisition unit 208, and the image data processing unit 212 which processes the RAW data read at the RAW data read unit 202 based on the image processing data acquired at the image processing data acquisition unit 210; and the image processing data storage server 300 includes the image correcting data memory unit 302 and image processing module memory unit 304 which store the image processing data, and the image processing data transmitting unit 306 which, in response to a request from the printer 200, transmits the image processing data of the image correcting data memory unit 302 or the image processing module memory unit 304 to the printer 200.

By doing so, the digital camera 100 outputs the RAW data added with the URL, so that the printer 200 can acquire the image processing data suitable for the RAW data based on the URL. Therefore, it is possible to obtain the printing result in relatively excellent accuracy with removing influence of characteristics depending on the type difference and the like. Further, since the acquisition site is represented by the URL, the printer 200 can utilize the image processing data storage server 300 without checking the acquisition site, so that the printer side can easily make wide adaptation over the digital camera 100 in comparison to the related art one. Moreover, since the image processing data is stored in the image processing data storage server 300, the contents of the image processing data can easily be changed even after the digital camera is provided, so that the printer 200 side can easily make flexible adaptation over the digital camera 100 in comparison to the related art one.

Further, in the present exemplary embodiment, the image processing data is image correcting data representing correcting values to carry out a calculation on the RAW data in order to correct the image constructed on the basis of the RAW data.

By doing so, the image correcting is carried out, so that it is possible to obtain the result of the image processing in better accuracy.

Further, in the present exemplary embodiment, the image processing data is an image processing module representing program data which corrects the image constructed on the basis of the RAW data.

By doing so, the image correcting is carried out, so that it is possible to obtain the result of the image processing in better accuracy.

Further, in the present exemplary embodiment, the digital camera 100 further includes the capturing information generating unit 108 which generates the capturing information and the capturing information adding unit 110 which adds the capturing information generated at the capturing information generating unit 108 to the RAW data.

By doing so, the digital camera 100 outputs the RAW data added with the capturing information and the URL, so that the printer 200 can acquire the image processing data suitable for the RAW data based on the URL and the image processing can be carried out based on the image processing data and the capturing information. Therefore, it is possible to obtain the result of the image processing in better accuracy.

Further, in the present exemplary embodiment, the image pick-up sensor unit 102 and the A/D converting unit 104 receive the image as RAW data.

By doing so, in the printer 200, the image processing can be carried out based on the RAW data, so that it is possible to obtain the result of the image processing in better accuracy.

Further, in the present exemplary embodiment, the digital camera 100 further includes the RAW data compressing unit 106 which compresses the received RAW data in a reversible compressing scheme, and the URL adding unit 114 adds the URL in the URL memory unit 112 to the compressed RAW data compressed at the RAW data compressing unit 106.

By doing so, in the digital camera 100, since the RAW data is compressed in the reversible compressing scheme, it is possible to reduce the necessary memory capacity, and also in the printer 200, since the image processing can be carried out based on the RAW data, it is possible to obtain the result of the image processing in better accuracy.

In the aforementioned exemplary embodiment, the digital camera 100 corresponds to the image capturing device of aspects 1, 2, 9, 16, 20, 21, 23, 24 or 27, the image pick-up sensor unit 102 and the A/D converting unit 104 correspond to the image receiving device of aspects 1, 2, 6, 9, 15, 16, 20 or 23. Furthermore, the receiving of the image pick-up sensor unit 102 and the A/D converting unit 104 correspond to the image receiving step of aspects 27 and 28, the RAW data compressing unit 106 corresponds to the image data compressing device of aspect 16, and the capturing information generating unit 108 corresponds to the capturing information generating device of aspect 9.

Further, in the aforementioned exemplary embodiment, the capturing information adding unit 110 corresponds to the capturing information associating device of aspect 9, the URL memory unit 112 corresponds to the access information memory device of aspects 2, 6, 16, 20, 23, 27 or 28, and the URL adding unit 114 corresponds to the access information associating device of aspects 1, 2, 6, 16, 20 or 23.

Furthermore, the adding of the URL adding unit 144 corresponds to the step of the access information associating step of aspect 27 or aspect 28, the printer 200 corresponds to the image processing terminal of aspects 1, 2, 19, 21, 22, 24, 25 or 27, and the RAW data read unit 202 corresponds to the image data input device of aspects 1, 2, 18, 21 or 24.

Further, in aforementioned exemplary embodiment, the read by the RAW data read unit 202 corresponds to the image data input step of aspect 27, the URL acquisition unit 208 corresponds to the access information acquisition device of aspects 2, 3, 21 or 24, and the acquisition by the URL acquisition unit 208 corresponds to the access information acquisition step of aspect 27. Furthermore, the image processing data acquisition unit 210 corresponds to the image processing data acquisition device of aspects 1 to 3, aspect 21 or aspect 24, the acquisition of the image processing data acquisition unit 210 corresponds to the image processing data acquisition step of aspect 27, and the image data processing unit 212 corresponds to the image data processing device of aspects 1, 2, 18, 19, 21 or 24.

Further, in aforementioned exemplary embodiment, the processing of the image data processing unit 212 corresponds to the image data processing step of aspect 27, the image processing data storage server 300 corresponds to the image processing data storage terminal of aspects 1 to 3, aspects 21, 22, 24, 25 or 27, and the image correcting data memory unit 302 and the image processing module memory unit 304 correspond to the image processing data memory device of aspects 2, 22, 25 or 27.

Furthermore, the image processing data transmitting unit 306 corresponds to the image processing data supplying device of aspects 2, 22 or 25, the transmitting of the image processing data transmitting unit 306 corresponds to the image processing data supplying step of aspect 27, and the URL corresponds to the access information of aspects 1 to 3, aspects 6, 14, 16, 20, 21, 23, 24, 26 to 28.

Further, in the aforementioned exemplary embodiment, the RAW data corresponds to the image data of aspect 1, aspect 2, aspects 4 to 6, aspect 9, aspect 16, aspects 18 to 21, aspect 23, aspect 24, aspects 26 to 28.

Furthermore, in the aforementioned exemplary embodiment, although the URL adding unit 114 have the construction that the URL of the URL memory unit 112 is added to the front end of the RAW data, it is not limited to the construction, but it may have the construction that the RAW data and the URL of the URL memory unit 212 are generated as separate files, respectively, and one of the RAW data file to store the RAW data and the URL file to store the URL is added with reference information having the other thereof as a reference site.

In this case, the image pick-up sensor unit 102 and the A/D converting unit 104 correspond to the image receiving device of aspect 7, the URL memory unit 112 corresponds to the access information memory device of aspect 7, the URL adding unit 114 corresponds to the access information associating device of aspect 7, and the URL corresponds to the access information of aspect 7. Further, the RAW data corresponds to the image data of aspect 7.

Furthermore, in the aforementioned exemplary embodiment, although the URL adding unit 114 have the construction that the URL of the URL memory unit 212 is added to the front end of the RAW data, it is not limited to the construction, but it may have the construction that the URL of the URL memory unit 212 are encrypted and the encrypted URL is superposed on the RAW data.

In this case, the image pick-up sensor unit 102 and the A/D converting unit 104 correspond to the image receiving device of aspect 8, the URL memory unit 112 corresponds to the access information memory device of aspect 8, the URL adding unit 114 corresponds to the access information associating device of aspect 8, and the URL corresponds to the access information of aspect 8. Further, the RAW data corresponds to the image data of aspect 8.

Further, in the aforementioned exemplary embodiment, although the construction that a plurality of the URLs are added to the RAW data is not specifically described, a plurality of the URL may be constructed to be added to the RAW data, as described below. In other words, in the URL memory unit 112, the URL is stored for every capturing mode. The URL adding unit 114 reads out the URLs corresponding to the different plurality of the capturing modes from the URL memory unit 112 and the read plurality of the URLs are added to the RAW data.

By doing so, the digital camera 100 outputs the RAW data added with the URLs corresponding to the different plurality of the capturing modes, so that the printer 200 can acquire the image processing data suitable for each of the capturing modes and the RAW data based on the URLs. Therefore, it is possible to obtain the result of the image processing specified to each of the capturing modes.

In this case, when a personal computer carries out the image processing in place of the printer 200, it is preferable that the personal computer is constructed as follows. In other words, the personal computer has a construction equivalent to that of the printer 200, and also has capturing modes designating unit which designates the capturing mode. The URL acquisition unit 208 acquires the URL corresponding to the capturing mode designated at the capturing mode designating unit, among the plurality of the URLs added to the RAW data which are read at the RAW data read unit 202.

By doing so, in the personal computer, it is possible to acquire the image processing data suitable for the capturing mode and the RAW data based on the URL corresponding to the capturing mode designated by user, etc. Therefore, it is possible to obtain the result of the image processing specified to the capturing mode designated by the user, etc. Furthermore, the designation of the capturing mode is not limit to the processing of the personal computer, and it is also possible that it is processed by the digital camera 100 or the printer 200, if necessary.

In this case, the URL memory unit 112 corresponds to the access information memory device of aspect 10, the URL adding unit 114 corresponds to the access information associating device of aspect 10, the RAW data read unit 202 corresponds to the image data input device of aspect 11, and the URL acquisition unit 208 corresponds to the access information acquisition device of aspect 11. Furthermore, the URL corresponds to the access information of aspect 10 or aspect 11. The RAW data corresponds to the image data of aspect 10 or aspect 11.

Further, in the aforementioned exemplary embodiment, although the construction that a plurality of the URLs are added to the RAW data is not specifically described, a plurality of the URL may be constructed to be added to the RAW data when the RAW data is processed by a personal computer used for general purposes other than the printer 200, as described below. In other words, in the URL memory unit 112, the URL is stored for every output device. The URL adding unit 114 reads out the URLs corresponding to the different plurality of the output devices from the URL memory unit 112 and the read plurality of the URLs are added to the RAW data.

By doing so, the digital camera 100 outputs the RAW data added with the URLs corresponding to the different plurality of the output devices, so that the personal computer can acquire the image processing data suitable for each of the output devices and the RAW data based on the URLs. Therefore, it is possible to obtain the result of the image processing specified by each of the output devices.

In this case, it is preferable that the personal computer is constructed as follows. In other words, the personal computer has an output devices designating unit which designates the output device. The URL acquisition unit 208 acquires the URL corresponding to the output device designated at the output device designating unit, among the plurality of the URLs added to the RAW data which are read at the RAW data read unit 202.

By doing so, in the personal computer, it is possible to acquire the image processing data suitable for the output device and the RAW data based on the URL corresponding to the output device designated by user, etc. Therefore, it is possible to obtain the result of the image processing specified by the output device designated by the user, etc.

In this case, the URL memory unit 112 corresponds to the access information memory device of aspect 12, the URL adding unit 114 corresponds to the access information associating device of aspect 12, the personal computer corresponds to the image processing terminal of aspect 13. The RAW data corresponds to the image data of aspect 12 or aspect 13.

Further, in the aforementioned exemplary embodiment, although the construction that the image processing data stored in the image processing data storage server 300 is compressed is not specifically described, the image processing data may be constructed to be compressed, as described below. In other words, in the image correcting data memory unit 302 and the image processing module memory unit 304, the compressed image processing data into which the image processing data is compressed using a predetermined compressing scheme is stored. Furthermore, the printer 200 includes the image processing data restoring unit which restores the compressed image processing data acquired at the image processing data acquisition unit 210 using a restoring scheme corresponding to the compressing scheme. The image data processing unit 212 processes the RAW data read at the RAW data read unit 202 based on the image processing data restored at the image processing data restoring unit.

By doing so, since the image processing data stored in the image processing data storage server 300 is compressed, it is possible to reduce the data capacity communicated between the printer 200 and the image processing data storage server 300.

In this case, the printer 200 corresponds to the image processing terminal of aspect 17, the RAW data read unit 202 corresponds to the image data input device of aspect 17, the image processing data acquisition unit 210 corresponds to the image processing data acquisition device of aspect 17, and the image data processing unit 212 corresponds to the image data processing device of aspect 17. Furthermore, the image correcting data memory unit 302 and the image processing module memory unit 304 correspond to the image processing data memory device of aspect 17, and the RAW data corresponds to the image data of aspect 17.

Furthermore, in the aforementioned exemplary embodiment, although it has the construction that the printer 200 carries out the image processing, it is not limited to the construction, but it may have the construction that the image process is carried out by a projector, a personal computer, a PDA (Personal Digital Assistant), a cellular phone, the PHS (a registered trade mark) (Personal Handyphone System), a watch-type PDA, or other image terminals for processing, for example.

Further, in the aforementioned exemplary embodiment, although the digital camera 100 is used as a device to capture the image, it is not limited to the digital camera, but a digital video camera, a scanner, a copy machine, or other image devices for capturing may be used, for example.

Furthermore, in the aforementioned exemplary embodiment, although it has the construction that the RAW data is stored in the RAW data memory unit 116 of the digital camera 100 and the RAW data in the RAW data memory unit 116 is output to the printer 200, it is not limited to the construction, but it may have the construction that, for example, the digital camera 100 and the printer 200 are communicatively connected to each other through a cable, etc., and the RAW data captured by the digital camera 100 is directly output to the printer 200 without being stored in the built-in memory. In this case, the RAW data memory unit 116 may not be provided.

Further, in the aforementioned exemplary embodiment, although the construction that the image processing data stored in the image processing data storage server 300 is encrypted is not specifically described, the image processing data may be encrypted, so that it is possible that each of the makers of the digital cameras 100 provide its image processing functions over each of the output devices without publishing its know-how. It is preferable that the encryption is carried out with, for example, a public key scheme, etc.

Further, in the aforementioned exemplary embodiment, although the printer 200 is illustrated to be used as an output device, it is not limited to the printer, but a display device (CRT (Cathode Ray Tube), LCD (Liquid Crystal Display), etc.), a laboratory machine, a laser printer, a sublimation type printer, or any other output devices may be used, for example.

Furthermore, in the aforementioned exemplary embodiment, although the URL is used, a dynamic link such as CGI and ASP is designated with respect to the URL, so that it is possible to increase the degree of freedom of the data acquisition method in case of actually carrying out acquisition at the time of reference. By doing so, it is possible for the maker of the digital camera 100 to freely update the image processing module and it is not necessary to perform some update such as rewriting of contents of ROM built in the digital camera 100 which may be a cause of operational failure.

Further, in the aforementioned exemplary embodiment, although the image processing module is not specifically described, it is possible to enhance generality by using the execution module format of defect standards, such as plug-in format of draw software, etc. Moreover, it is possible to further enhance generality by using the execution module format that the execution environment, such as JAVA (a registered trade mark), etc. is not chosen.

Further, in the aforementioned exemplary embodiment, although the digital camera 100 and the printer 200 are connected through a predetermined cable, it is not limited to the cable, but any wireless communication such as Bluetooth, etc. may be used for connection therebetween.

Furthermore, in the aforementioned exemplary embodiment, although it has the construction that the digital camera 100 compresses the received RAW data in a reversible compressing scheme, it is not limited to the construction, but it may have the construction that an irreversible compressing scheme or other compressing scheme is used for the compression.

Further, in the aforementioned exemplary embodiment, although it has the construction that the image data processing unit 212 carries out the image process based on the capturing information from the capturing information acquisition unit 206 and the image processing data from the image processing data acquisition unit 210, it is not limited to the construction, and if various characteristics (spectral distribution characteristics, xyPoint, dynamic ranges, against-noise performances, optical filter characteristics, etc.) of the image pick-up sensor unit 102 and the digital camera 100 itself as well as an arrangement of RGB and CMYG besides the information of the image pick-up sensor unit 102 are used, it is possible to carry out the processing with more efficiency at the color interpolating unit 212a or the color correcting unit 212b. Furthermore, the characteristics of the image pick-up sensor 102 and the digital camera 100 itself may be added to the image data to be applied to the image processing block, or may be received form the image processing data storage server 300.

Further, in the aforementioned exemplary embodiment, although it has the construction that the color interpolating unit 212a is corresponded to a single-plate type of the capturing device, it is not limited to the construction, but it may have the construction that a multiple-plate type of capturing device other than the single-plate type one may be since the digital camera 100 can be considered to have two-plate type, three-plate type, or others, for example.

Furthermore, in the aforementioned exemplary embodiment, although it has the construction that the image data processing unit 212 carries out the image process in the sequence of the color interpolating, the color correction, the sharpness processing, the noise removing processing, and the color converting, but it is not limited the sequence, but any sequence of the image processing may be carried out. In particular, when the plurality of processings are carried out by the only one of the image processing modules, the sequence may be changed depending on the format of the image processing module.

Further, in the aforementioned exemplary embodiment, although it has the construction that after the image process is carried out, the printing or the displaying is carried out based on the image data carried out with image processing, it is not limited to the construction, but it may have the construction that after the image process is carried out, the image processing data carried out with image processing is stored or transmitted.

Furthermore, although aforementioned exemplary embodiment is constructed with the digital camera 100, the printer 200 and the image processing data storage server 300, it is not limited the construction, but it may be constructed with the digital camera 100, the image processing data storage server 300, an image processing server and network printer. In this case, after the capturing is carried out with the digital camera 100, the image data is transmitted to the network, the image process is carried out with the image processing server during the transmission, and then it is transmitted to the network printer.

Further, in the aforementioned exemplary embodiment, although in the executions of the processes shown in the flowcharts in FIGS. 2 and 3, both of them are described in case of execution of the control program previously stored in ROM, it is not limited to the case, but the program that represents the sequence of the processes is read in RAM from the storage media that the program is stored and then is carried out.

Here, the storage media includes a semiconductor storage media, such as RAM, ROM, etc. a magnetically stored type of storage media, such as FD, HD, etc. an optically read type of storage media, such as CD, CDV, LD, and DVD, and a magnetically stored/optically read type of storage media such as MO, the storage media is all the storage media which are readable in a computer regardless of all the read methods such as electronic, magnetic or optical method.

Further, although the aforementioned exemplary embodiment is described in case that the image processing system, the image capturing device, the image processing terminal, the image processing data storage terminal, the program for the device, the program for the terminal, the data structure of an image data, the method of processing an image, and the method of generating an image data are adapted to the network system constructed through the Internet 199, it is not limited the case, but the a system called an intranet which makes communication in the same manner as the Internet 199 may be adapted. It is not limited to a network which makes communication in the same manner as the Internet 199, but the typical networks may be adapted.

Further, although the aforementioned exemplary embodiment is described in case that the image processing system, the image capturing device, the image processing terminal, the image processing data storage terminal, the program for the device, the program for the terminal, the data structure of an image data, the method of processing an image, and the method of generating an image data are adapted to the case that the image data captured by the digital camera 100 is processed with the printer 200 to carry out printing, as shown in FIG. 1, it is not limited the case, but it is may be adapted to other cases without departing from the scope and the spirit of the present invention.

[Advantages]

As described above, according to the image processing system disclosed in aspects 1 to 19, the image capturing devices associate the image data with the access information to output the image data, so that it is possible that the image processing terminal acquires the image processing data suitable for the image data based on the access information. Therefore, an advantage that it is possible to obtain the image processing result in relatively excellent accuracy with removing influence of characteristics depending on the type difference and the like is obtained. Further, since the acquisition site is represented in the access information, the image processing terminal can utilize the image processing data storage terminal without checking the acquisition site, so that an advantage that wide adaptation over the image capturing device can be relatively easily made in comparison to the related art one is also obtained. Moreover, since the image processing data is stored in the image processing data storage terminal, the contents of the image processing data can easily be changed even after the image capturing device is provided, so that an advantage that flexible adaptation over the image capturing device can be relatively easily made in comparison to the related art one is also obtained.

Furthermore, according to the image processing system disclosed in aspects 3 to 19, since the image processing data storage terminal specified by the access information is accessed, a plurality of the image processing data storage terminals can be utilized without the image processing terminal checking the acquisition site, so that an advantage that wide adaptation over the image capturing device can be further easily made is also obtained.

Furthermore, according to the image processing system disclosed in aspects 4 or 5, since the correcting of the image is carried out, an advantage that the image processing result can be obtained in a better accuracy is also obtained.

Furthermore, according to the image processing system disclosed in aspect 9, the image capturing devices associate the image data with the capturing information and the access information to output the image data, so that it is possible that the image processing terminal acquires the image processing data suitable for the image data based on the access information and carries out the image process based on the image processing data and the capturing information. Therefore, an advantage that it is possible to obtain the image processing result in a better accuracy is also obtained.

Furthermore, according to the image processing system disclosed in aspects 10 or 11, the image capturing devices associate the image data with the access information corresponding to a different plurality of the capturing modes to output the image data, so that it is possible that the image processing terminal acquires the image processing data suitable for the image data and each of the capturing modes based on the access information. Therefore, an advantage that it is possible to obtain the image processing result specified to each of the capturing modes is also obtained.

Furthermore, according to the image processing system disclosed in aspect 11, in the image processing terminal, it is possible to obtain the image processing data suitable for the capturing mode and the image data based on the access information corresponding to the capturing mode designated by users, etc. Therefore, an advantage that it is possible to obtain the image processing result specified to the capturing mode designated by users, etc. is also obtained.

Furthermore, according to the image processing system disclosed in aspects 12 or 13, the image capturing devices associate the image data with the access information corresponding to the plurality of different output devices to output the image data, so that it is possible that the image processing terminal acquires the image processing data suitable for the image data and each of the output devices based on the each access information. Therefore, an advantage that it is possible to obtain the image processing result specified to each of the output devices is also obtained.

Furthermore, according to the image processing system disclosed in aspect 13, in the image processing terminal, it is possible to obtain the image processing data suitable for the output device and the image data based on the access information corresponding to the output device designated by users, etc. Therefore, an advantage that it is possible to obtain the image processing result specified to the output device designated by users, etc. is also obtained.

Further, according to the image processing system disclosed in aspects 15 or 16, in the image processing terminal, the image process can be carried out based on the RAW data, and therefore an advantage that it is possible to obtain the image processing result in a better accuracy is also obtained.

Furthermore, according to the image processing system disclosed in aspect 16, since in the image capturing device the RAW data is compressed using a predetermined compressing scheme, an advantage that it is possible to reduce the necessary memory capacity is obtained, and since in the image processing terminal the image process can be carried out based on the RAW data, an advantage that it is possible to obtain the image processing result in a better accuracy is also obtained.

Furthermore, according to the image processing system disclosed in aspect 17, since the image processing data stored in the image processing data storage terminal is compressed, an advantage that it is possible to reduce the data capacity communicated between the image processing terminal and the image processing data storage terminal is also obtained.

Furthermore, according to the image processing system disclosed in aspect 19, the image capturing devices associate the image data with the access information to output the image data, so that it is possible that the printer acquires the image processing data suitable for the image data based on the access information. Therefore, an advantage that it is possible to obtain the printing result in relatively excellent accuracy with removing influence of characteristics depending on the type difference and the like is obtained. Further, since the acquisition site is represented in the access information, the printer can utilize the image processing data storage terminal without checking the acquisition site, so that an advantage that the printer side can relatively easily make wide adaptation over the image capturing device in comparison to the related art one is also obtained. Moreover, since the image processing data is stored in the image processing data storage terminal, the contents of the image processing data can easily be changed even after the image capturing device is provided, so that an advantage that the printer side can relatively easily make flexible adaptation over the image capturing device in comparison to the related art one is also obtained.

Further, according to the image capturing device in aspect 20, it is possible to obtain advantage equivalent to those of the image processing system in aspect 2.

Further, according to the image processing terminal in aspect 21, it is possible to obtain advantage equivalent to those of the image processing system in aspect 2.

Further, according to the image processing data storage terminal in aspect 22, it is possible to obtain advantage equivalent to those of the image processing system in aspect 2.

Further, according to the program for the device in aspect 23, it is possible to obtain advantage equivalent to those of the image capturing device in aspect 20.

Further, according to the program for the terminal in aspect 24, it is possible to obtain advantage equivalent to those of the image processing terminal in aspect 21.

Further, according to the program for the terminal in aspect 25, it is possible to obtain advantage equivalent to those of the image processing data storage terminal in aspect 22.

Further, according to the data structure of the image data in aspect 26, it is possible to obtain advantage equivalent to those of the image processing system in aspect 6.

Further, according to the method of processing an image in aspect 27, it is possible to obtain advantage equivalent to those of the image processing system in aspect 2.

Further, according to the method of generating an image data in aspect 28, it is possible to obtain advantage equivalent to those of the data structure of the image data in

What is claimed is:

1. An image processing system, comprising:
   an image capturing device;
   an image processing data storage terminal to store image processing data necessary to carry out image processing; and
   an image processing terminal to carry out the image processing;
   the image processing system processing with the image processing terminal, the image data captured by the image capturing device based on the image processing data in the image processing data storage terminal;

the image processing data storage terminal and the image processing terminal being communicatively connected to each other;

the image capturing device including an image receiving device to receive images as data and an access information associating device to associate access information indicating an acquisition site of the image processing data with the image data received by the image receiving device;

the image processing terminal including an image data input device to input the image data from the image capturing device, an image processing data acquisition device to acquire the image processing data from the image processing data storage terminal based on the access information associated with the image data input by the image data input device, and an image data processing device to process the image data input by the image data input device based on the image processing data acquired by the image processing data acquisition device; and the image processing data storage terminal providing the image processing data in response to a request from the image processing terminal.

2. An image processing system, comprising:

an image capturing device;

an image processing data storage terminal to store image processing data necessary to carry out image processing; and an image processing terminal to carry out the image processing:

the image processing system processing with the image processing terminal, the image data captured by the image capturing device based on the image processing data in the image processing data storage terminal;

the image processing data storage terminal and the image processing terminal being communicatively connected to each other;

the image capturing device including an image receiving device to receive images as data, an access information memory device to store access information indicating an acquisition site of the image processing data, and an access information associating device to associate the access information in the access information memory device with the image data received by the image receiving device;

the image processing terminal including an image data input device to input the image data from the image capturing device, an access information acquisition device to acquire the access information associated with the image data input by the image data input device, an image processing data acquisition device to acquire the image processing data from the image processing data storage terminal based on the access information acquired by the access information acquisition device, and an image data processing device to process the image data input by the image data input device based on the image processing data acquired by the image processing data acquisition device; and the image processing data storage terminal including an image processing data memory device to store the image processing data, and an image processing data supplying device to supply an image processing data corresponding to a request from the image processing terminal, among the image processing data in the image processing data memory device to the image processing terminal.

3. The image processing system according to claim 2, further comprising a plurality of the image processing data storage terminals, the image processing data acquisition device accessing the image processing data storage terminal specified by the access information acquired by the access information acquisition device, among the plurality of image processing data storage terminals, and acquiring the image processing data from the image processing data storage terminal.

4. The image processing system according to claim 3, the image processing data being image correcting data representing correcting values to carry out a calculation on the image data in order to correct an image constructed on the basis of the image data.

5. The image processing system according to claim 3, the image processing data being an image processing module representing program data which corrects an image constructed on the basis of the image data.

6. The image processing system according to claim 3, the access information associating device adding the access information in the access information memory device to the image data received by the image receiving device.

7. A data structure of image data in the image processing system according to claim 6, comprising:

an acquisition site of the image processing data, the image data and the access information indicating the acquisition site of the image processing data, the access information being added to the image data.

8. The image processing system according to claim 3, the access information associating device generating files in a separate manner from the image data received by the image receiving device and the access information in the access information memory device, and adding reference information to one of the image data files storing the image data and the access information file storing the access information, the reference information having the other thereof as a reference site.

9. The image processing system according to claim 3, the access information associating device encrypting the access information in the access information memory device, and superposing the encrypted access information on the image data received by the image receiving device.

10. The image processing system according to claim 3, the image capturing device further comprising a capturing information generating device to generate capturing information representing capturing modes or a capturing environment of the image over the image data received by the image receiving device, and a capturing information associating device to associate the capturing information generated by the capturing information generating device with the image data received by the image receiving device.

11. The image processing system according to claim 3, the access information memory device storing the access information for each of the capturing modes of the image when a plurality of capturing modes are defined; and the access information associating device reading out the access information corresponding to the plurality of capturing modes, which are all different, from the access information memory device, and associating a plurality of pieces of read access information with the image data.

12. The image processing system according to claim 11, the image processing terminal further comprising a capturing mode designating device to designate the capturing mode, and the access information acquisition device acquiring the access information corresponding to the capturing mode designated by the capturing mode designating device among the plurality of pieces of access information associated with the image data input by the image data input device.

13. The image processing system according to claim 3, the access information memory device storing the access information for each of the output devices when a plurality of output devices to output the image constructed on the basis of the image data are defined; and the access information associating device reading out the access information associated with a plurality of different output devices from the access information memory device, and associating the plurality of pieces of read access information with the image data.

14. The image processing system according to claim 13, the image processing terminal further comprising an output device designating device to designate the output device, and the access information acquisition device acquiring the access information associated with the output device designated by the output device designating device among the plurality of pieces of access information associated with the image data input by the image data input device.

15. The image processing system according to claim 3, the access information being a URL (Uniform Resource Locator).

16. The image processing system according to claim 3, the image receiving device receiving the image as RAW data.

17. The image processing system according to claim 16, the image capturing device further comprising an image data compressing device to compress the RAW data received by the image receiving device using a predetermined compressing scheme, and the access information associating device associating the access information in the access information memory device with the compressed image data compressed by the image data compressing device.

18. The image processing system according to claim 3, the image processing data memory device storing the compressed image processing data into which the image processing data is compressed using a predetermined compressing scheme, the image processing terminal further comprising an image processing data restoring device to restore the compressed image processing data acquired by the image processing data acquisition device using a restoring scheme corresponding to the compressing scheme, and the image data processing device processing the image data input by the image data input device based on the image processing data restored by the image processing data restoring device.

19. The image processing system according to claim 3, the image data processing device generating CMYK data from the image data input by the image data input device.

20. An image capturing device adapted to the image processing system according to claim 2, comprising:

an image receiving device to receive images as data;

an access information memory device to store access information indicating an acquisition site of the image processing data; and an access information associating device to associate the access information in the access information memory device with the image data received by the image receiving device.

21. A computer-readable medium encoded with computer-executable instructions according to claim 20, comprising:

instructions for executing a process implemented by the access information associating device to associate the access information in the access information memory device with the image data received by the image receiving device.

22. An image processing data storage terminal adapted to the image processing system according to claim 2, comprising:

an image processing data memory device to store the image processing data; and an image processing data supplying device to supply an image processing data corresponding to a request from the image processing terminal among the image processing data in the image processing data memory device to the image processing terminal.

23. A computer-readable medium encoded with computer-executable instructions according to claim 22, comprising:

instructions for executing a process implemented by the image processing data supplying device to supply an image processing data corresponding to a request from the image processing terminal among the image processing data in the image processing data memory device to the image processing terminal.

24. An image processing terminal adapted to the image processing system according to claim 2, comprising:

an image data input device to input the image data from the image capturing device;

an access information acquisition device to acquire access information associated with the image data input by the image data input device;

an image processing data acquisition device to acquire the image processing data from the image processing data storage terminal based on the access information acquired by the access information acquisition device; and an image data processing device to process the image data input by the image data input device based on the image processing data acquired by the image processing data acquisition device.

25. A computer-readable medium encoded with computer-executable instructions according to claim 24, comprising:

instructions for executing process implemented by the image data input device to input the image data from the image capturing device, the access information acquisition device to acquire the access information associated with the image data input by the image data input device, the image processing data acquisition device to acquire the image processing data from the image processing data storage terminal based on the access information acquired by the access information acquisition device, and the image data processing device to process the image data input by the image data input device based on the image processing data acquired by the image processing data acquisition device.

26. The image processing system according to claim 3, the image processing terminal being a printer to carry out printing based on the image data processed by the image data processing device.

27. An image processing method of communicatively connecting to each other an image processing data storage terminal to store image processing data necessary to carry out image processing and an image processing terminal to carry out the image processing based on the image processing data, and the processing of the image data captured by the image capturing device using the image processing data storage terminal, the image processing terminal and the image capturing device, the method comprising:

in the image capturing device:
  receiving an image as data; and
  storing and associating access information indicating an acquisition site of the image processing data with the image data received in the image receiving in an access information memory device;

in the image processing terminal:
  inputting the image data from the image capturing device;
  acquiring the access information associated with the image data input in the image data inputting; and
  acquiring the image processing data from the image processing data storage terminal based on the access information acquired in the access information acquiring;

in the image processing data storage terminal:
  supplying, in response to a request from the image processing terminal, image processing data among image processing data in an image processing data memory device to store the image processing data to the image processing terminal; and in the image processing terminal:
  processing image data input in the image data inputting based on the image processing data acquired in the image processing data acquiring.

* * * * *